(12) United States Patent
Ezawa et al.

(10) Patent No.: US 8,248,483 B2
(45) Date of Patent: Aug. 21, 2012

(54) SIGNAL PROCESSING APPARATUS, SIGNAL PROCESSING METHOD, CONTROL PROGRAM, READABLE RECORDING MEDIUM, SOLID-STATE IMAGE CAPTURING APPARATUS, AND ELECTRONIC INFORMATION DEVICE

(75) Inventors: Masayuki Ezawa, Osaka (JP); Masayuki Shinagawa, Osaka (JP); Toshihiro Akamatsu, Osaka (JP)

(73) Assignee: Sharp Kabushiki Kaisha, Osaka-Shi, Osaka (JP)

( * ) Notice: Subject to any disclaimer, the term of this patent is extended or adjusted under 35 U.S.C. 154(b) by 439 days.

(21) Appl. No.: 12/457,636

(22) Filed: Jun. 17, 2009

(65) Prior Publication Data
US 2009/0316020 A1 Dec. 24, 2009

(30) Foreign Application Priority Data
Jun. 19, 2008 (JP) .................................. 2008-161038

(51) Int. Cl.
*H04N 5/228* (2006.01)
*H04N 9/73* (2006.01)

(52) U.S. Cl. .................................. 348/222.1; 348/226.1

(58) Field of Classification Search ............... 348/226.1, 348/227.1, 228.1
See application file for complete search history.

(56) References Cited

U.S. PATENT DOCUMENTS

| | | | | |
|---|---|---|---|---|
| 5,822,008 A * | 10/1998 | Inoue et al. | .................... | 348/446 |
| 6,154,258 A * | 11/2000 | Ohtsuka | ..................... | 348/226.1 |
| 7,561,306 B2 * | 7/2009 | Nguyen | ........................ | 348/251 |
| 2003/0112343 A1* | 6/2003 | Katoh et al. | .............. | 348/226.1 |
| 2003/0142239 A1* | 7/2003 | Yoshida et al. | ............... | 348/607 |
| 2004/0179114 A1* | 9/2004 | Silsby et al. | ............... | 348/226.1 |
| 2005/0163492 A1* | 7/2005 | Ueda et al. | .................... | 386/109 |
| 2006/0210259 A1* | 9/2006 | Matsumoto | ................... | 396/127 |
| 2007/0013785 A1* | 1/2007 | Kinoshita et al. | .......... | 348/222.1 |
| 2007/0146500 A1* | 6/2007 | Lee et al. | ................... | 348/226.1 |
| 2008/0298716 A1* | 12/2008 | Yamagata | ..................... | 382/275 |
| 2008/0303920 A1* | 12/2008 | Kinoshita | .................. | 348/226.1 |
| 2009/0135276 A1* | 5/2009 | Urisaka | ......................... | 348/241 |

FOREIGN PATENT DOCUMENTS
JP 2005-347939 12/2005
WO WO 2005120047 A1 * 12/2005
* cited by examiner

*Primary Examiner* — Sinh Tran
*Assistant Examiner* — Jason Flohre
(74) *Attorney, Agent, or Firm* — Edwards Wildman Palmer LLP; David G. Conlin; George N. Chaclas

(57) ABSTRACT

A signal processing apparatus according to the present invention includes: a common pre-processing section for performing signal processing common to a photographed image process and a flicker detection process on an input image signal; a photographed image processing section for performing image signal processing for a displayed image on an image signal from the common pre-processing section; a flicker detection pre-processing section for performing image signal processing for flicker detection on the image signal from the common pre-processing section; and a flicker detecting section for performing flicker detection based on the image signal from the flicker detection pre-processing section.

32 Claims, 15 Drawing Sheets

FIG.6
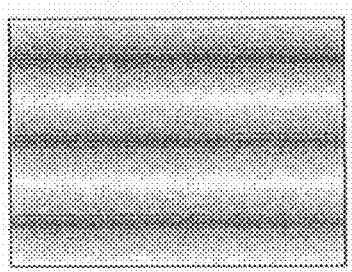
(a)
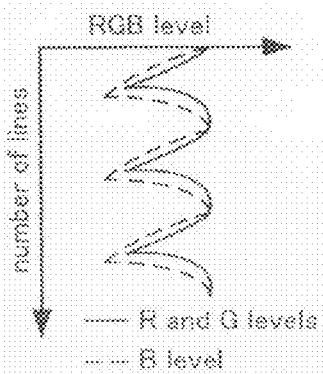
(b)
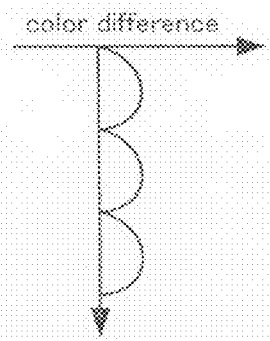
(c)

SIGNAL PROCESSING APPARATUS, SIGNAL PROCESSING METHOD, CONTROL PROGRAM, READABLE RECORDING MEDIUM, SOLID-STATE IMAGE CAPTURING APPARATUS, AND ELECTRONIC INFORMATION DEVICE

This nonprovisional application claims priority under 35 U.S.C. §119(a) to Patent Application No. 2008-161038 filed in Japan on Jun. 19, 2008, the entire contents of which are hereby incorporated by reference.

BACKGROUND OF THE INVENTION

1. Field of the Invention

The present invention relates to a signal processing apparatus for detecting a flicker from an image signal obtained from a CMOS (Complementary Metal Oxide Semiconductor) type image capturing device and the like, which performs a photoelectric conversion on light from a subject and captures an image of the subject; a signal processing method; a control program including processing steps for allowing a computer to execute each step of the signal processing method; a computer-readable recording medium storing the control program as data; a solid-state image capturing apparatus having the signal processing apparatus used therein; and an electronic information device, such as a digital camera (e.g., a digital video camera and a digital still camera), an image input camera, a scanner, a facsimile machine, and a camera-equipped cell phone device, having the solid-state image capturing apparatus with the signal processing apparatus as an image input device used in an image capturing section thereof.

2. Description of the Related Art

Under a fluorescent light (lamp) using an alternating current source except for the inverter type, lateral striped light and dark portions, referred to as flicker noise, conventionally appear on a photographed image of a display screen when the image is taken by a CMOS type image capturing device. This is due to the change in the amount of the fluorescent light in accordance with cycles of the power source voltage.

In regard to this problem, Reference 1 proposes a method for detecting a flicker frequency from an image signal that is processed to obtain a photographed image in a pre-processing section.

FIG. 14 is a block diagram illustrating an exemplary essential configuration of a conventional digital signal processing apparatus disclosed in Reference 1.

In FIG. 14, the conventional digital signal processing apparatus is used for an image capturing apparatus, and includes a pre-processing section 50; a flicker detecting and reducing section 60; and a post-processing section 70.

The pre-processing section 50 includes a digital clamp circuit 51; an inter-read-out channel gain correction circuit 52; a fixed pattern noise reduction circuit 53; a defective pixel data correction circuit 54; a noise reduction circuit 55; a lens shading correction circuit 56; and a digital gain adjustment circuit 57. That is, the pre-processing section 50 clamps an RGB primary color signals, which are A/D converted after being obtained from an image capturing element; corrects the gain between read-out channels with regard to the RGB primary color signals having clamped black levels; reduces fixed pattern noise; corrects data of defective pixels; reduces noise; corrects lens shading; and adjusts the gain for exposure adjustment.

When signals inputted from an analog signal processing section are RGB primary color signals, the digital clamp circuit 51 clamps the black level of the inputted RGB primary color signals at a predetermined level.

The inter-read-out channel gain correction circuit 52 corrects a signal gain for the RGB primary color signals with the clamped black level of each read-out channel, in such a manner to eliminate the variation of the signal gain for each read-out channel, when image-capturing signals are read out from a CMOS image capturing device by a plurality of read-out channels.

The fixed pattern noise reduction circuit 53 reduces vertical striped fixed pattern noise for the RGB primary color signals after the inter-read-out channel gain correction.

The defective pixel data correction circuit 54 corrects data (pixel value) of a defective pixel detected by a defective pixel detection circuit 74 in a post-processing section 70, in the RGB primary colors after the fixed noise pattern reduction. Particularly, data of a defective pixel is calculated and generated by an interpolation operation from data of pixels around the defective pixel, and the original data is replaced with the calculated and generated data.

The noise reduction circuit 55 reduces noise for the RGB primary colors after the defective pixel data correction. The noise in this case is a general high frequency noise different from the fixed pattern noise described above. Particularly, a filtering process is performed to extract only a low frequency component from the RGB primary color signals to reduce the noise.

The lens shading correction circuit 56 corrects lens shading (which is a phenomenon where signal amounts differ from each other depending on image focusing locations, such at a middle part or a peripheral part, and in general, an image becomes darker and the signal amount decreases as the location moves further away from the center of the optical axis of a lens) for the RGB primary color signals after the noise reduction.

The digital gain adjustment circuit 57 performs brightness adjustment by adjusting a gain of the RGB primary color signals after the lens shading correction for exposure adjustment, by the gain setting of a system controller (not shown). In the image capturing apparatus, the exposure amount can be adjusted by the iris setting, the electronic shutter speed setting, and the gain adjustment by the digital gain adjustment circuit 57. By adjusting the gain by the digital gain adjustment circuit 57 operating together with the iris setting and the electronic shutter speed setting, a desired exposure amount can be obtained and an automatic exposure adjustment function can be achieved as well.

The flicker detecting and reducing section 60 detects a flicker of a fluorescent light and reduces a flicker component.

The post-processing section 70 includes a white balance adjustment circuit 71; a gamma correction circuit 72; a matrix synthesizing circuit 73; and a defective pixel detection circuit 74. The white balance is adjusted for the RGB primary color signals after the flicker reduction, a defective pixel of the image capturing device is detected from the RGB primary color signals after the white balance adjustment, and a gamma correction is performed, and a brightness signal Y and color difference signals R-Y and B-Y are generated.

The white balance adjustment circuit 71 adjusts each gain for the white balance that normalizes the balance of the signal level of each of the RGB primary signals.

The gamma correction circuit 72 changes the gradation of the RGB primary color signals after the white balance adjustment in accordance with the gradation characteristic of a display apparatus.

The matrix synthesizing circuit 73 generates a brightness signal Y, color difference signals R-Y and B-Y, as the output of a digital signal processing apparatus, from the RGB primary color signals after the gamma correction.

The defective pixel detection circuit 74 detects a defective pixel of the CMOS image capturing device from the output signal from the white balance adjustment circuit 71, and outputs the defective pixel detection result to the defective pixel data correction circuit 54.

Reference 1: Japanese Laid-Open Publication No. 2005-347939

SUMMARY OF THE INVENTION

In the subject matter of Reference 1 described above, an inappropriate correction may be made on a photographed image when a pre-process is performed to improve a flicker detection accuracy. For example, in the flicker detection, it is desirable to perform the correction by the lens shading correction circuit 56 to have the brightness level of the signals constant from the middle part to the peripheral part. However, in a photographed image, when the gain is increased in the peripheral part more than the middle part of a display screen as illustrated in FIG. 15, a noise component N is also increased and emphasized in the peripheral part, and as a result, an inappropriate correction is made in the peripheral part resulting in a large noise component N. In summary, when the accuracy of the flicker detection is increased, the noise component N increases in a photographed image, which means that the flicker detection accuracy and the image quality are in a trade off relationship.

Therefore, a shading correction is not normally performed for the image quality in such a manner to make brightness to be flat (corresponding to a constant signal level) from the middle part to the peripheral part of a display screen (100 percent correction). However, in this case, the low frequency component remains among spacial frequencies due to the lens shading. In particular, there is a possibility of error in the flicker detection when a frame rate is fast and the number of bright and dark lateral stripes of the flicker noise is low.

The present invention is intended to solve the conventional problems described above. The objective of the present invention is to provide a signal processing apparatus and a signal processing method using the signal processing apparatus, capable of detecting a flicker frequency with high accuracy, without a harmful influence to an image to be photographed due to the flicker detection; a control program for allowing a computer to execute each step of the signal processing method; a computer-readable recording medium storing the control program as data; a solid-state image capturing apparatus having the signal processing apparatus used therein; and an electronic information device, such as a camera-equipped cell phone device, having the solid-state image capturing apparatus with the signal processing apparatus as an image input device used in an image capturing section thereof.

A signal processing apparatus according to the present invention includes: a common pre-processing section, for performing signal processing common to a photographed image process and a flicker detection process, on an input image signal; a photographed image processing section for performing image signal processing on an image signal from the common pre-processing section to generate a displayed image; a flicker detection pre-processing section for performing image signal processing on the image signal from the common pre-processing section for flicker detection; and a flicker detecting section for performing flicker detection based on the image signal from the flicker detection pre-processing section, thereby achieving the objective described above.

Preferably, in a signal processing apparatus according to the present invention, the flicker detecting section performs flicker detection by using brightness signal information of an image signal from the flicker detection pre-processing section.

Still preferably, in a signal processing apparatus according to the present invention, the flicker detecting section performs flicker detection by using brightness signal information and color difference signal information of an image signal from the flicker detection pre-processing section.

Still preferably, in a signal processing apparatus according to the present invention, between a brightness frequency detecting section for detecting a spatial frequency of a brightness signal in a vertical direction of an image and a color difference frequency detecting section for detecting a spatial frequency of color difference signals U and V in the vertical direction of the image, the flicker detecting section includes at least the brightness frequency detecting section.

Still preferably, in a signal processing apparatus according to the present invention, the flicker detecting section includes: a first horizontal direction integration circuit for successively integrating a brightness signal among image signals from the flicker detection pre-processing section, for each line of a display screen in a horizontal direction; a first frequency conversion circuit for performing a discrete Fourier transform process on an integration value that is integrated in the first horizontal direction integration circuit; and a first frequency detection circuit for detecting a spatial frequency at which a power of the brightness signal is at a maximum, based on a result of the discrete Fourier transform process.

Still preferably, in a signal processing apparatus according to the present invention, the flicker detecting section includes: a first horizontal direction integration circuit for successively integrating a brightness signal from the flicker detection pre-processing section, for each line of a display screen in the horizontal direction; a first frequency conversion circuit for performing a discrete Fourier transform process on an integration value integrated in the first horizontal direction integration circuit; a first frequency detection circuit for detecting a spatial frequency at which a power of the brightness signal is at a maximum, based on a result of the discrete Fourier transform process in the first frequency conversion circuit; a second horizontal direction integration circuit for successively integrating a color difference signal U from the flicker detection pre-processing section, for each line of the display screen in the horizontal direction; a second frequency conversion circuit for performing a discrete Fourier transform process on an integration value integrated in the second horizontal direction integration circuit; a second frequency detection circuit for detecting a spatial frequency at which a power of the brightness signal is at a maximum, based on a result of the discrete Fourier transform process in the second frequency conversion circuit; a third horizontal direction integration circuit for successively integrating a color difference signal V from the flicker detection pre-processing section, for each line of the display screen in the horizontal direction; a third frequency conversion circuit for performing a discrete Fourier transform process on an integration value integrated in the third horizontal direction integration circuit; and a third frequency detection circuit for detecting a spatial frequency that at which a power of the brightness signal is at a maximum, based on a result of the discrete Fourier transform process in the third frequency conversion circuit.

Still preferably, in a signal processing apparatus according to the present invention, a flicker frequency is determined by a majority of respective flicker frequencies from the first, second and third frequency detection circuits.

Still preferably, in a signal processing apparatus according to the present invention, the flicker detection pre-processing section includes a shading correcting section for correcting an image in horizontal and vertical directions of the image.

Still preferably, in a signal processing apparatus according to the present invention, the flicker detection pre-processing section includes a shading correcting section for correcting an image in a vertical direction of the image.

Still preferably, in a signal processing apparatus according to the present invention, the shading correcting section performs 90 to 100 percent of shading correction.

Still preferably, in a signal processing apparatus according to the present invention, the photographed image processing section includes a shading correcting section for correcting an image in horizontal and vertical directions of the image.

Still preferably, in a signal processing apparatus according to the present invention, the photographed image processing section includes a shading correcting section for correcting the image in a horizontal direction of the image, and data inputted from the shading correcting section in the vertical direction of the image of the flicker detection pre-processing section, is processed via multiplication with data from the shading correcting section for correcting the image in the horizontal direction of the image, so that a shading correction process in horizontal and vertical directions of the image is performed in the photographed image processing section.

Still preferably, in a signal processing apparatus according to the present invention, the common pre-processing section includes a shading correcting section for correcting an image in a vertical direction of the image, the photographed image processing section includes a shading correcting section for correcting the image in a horizontal direction of the image wherein data is processed via multiplication with data inputted from the shading correcting section for correcting the image in the vertical direction of the image, and the flicker detection pre-processing section inputs the data from the shading correcting section for correcting the image in the vertical direction of the image.

Still preferably, in a signal processing apparatus according to the present invention, the flicker detection pre-processing section includes a digital gain correcting section for correcting signal levels of three colors that vary due to a color temperature of a light source.

Still preferably, in a signal processing apparatus according to the present invention, the flicker detection pre-processing section includes an interpolation section for generating a brightness signal Y and color difference signals U and V from inputted primary RGB color signals.

Still preferably, in a signal processing apparatus according to the present invention, the flicker detection pre-processing section includes a light and shade correcting section for correcting light and shade of a displayed image.

Still preferably, in a signal processing apparatus according to the present invention, the flicker detection pre-processing section includes a shading correcting section for correcting a decrease of a peripheral light amount due to lens shading; a digital gain correcting section for correcting signal levels of three colors that vary due to a color temperature of a light source; an interpolation section for generating a brightness signal Y and color difference signals U and V from inputted primary RGB color signals; and a light and shade correcting section for correcting light and shade of an displayed image.

Still preferably, in a signal processing apparatus according to the present invention, the light and shade correcting section emphasizes contrast to perform an emphasizing process for light and shade of a displayed image.

Still preferably, in a signal processing apparatus according to the present invention, the flicker detection pre-processing section includes a shading correcting section for correcting a decrease of a peripheral light amount due to lens shading; a digital gain correcting section for correcting signal levels of three colors that vary due to a color temperature of a light source; and an interpolation section for generating a brightness signal Y and color difference signals U and V from inputted primary RGB color signals.

Still preferably, in a signal processing apparatus according to the present invention, the flicker detection pre-processing section further includes a brightness change determining section for determining whether the brightness is changed by an amount of equal to or more than a predetermined value to decide the start a flicker detection pre-process.

A solid-state image capturing apparatus according to the present invention includes: an image capturing device having therein a plurality of light receiving sections for performing a photoelectric conversion on light from a subject and capturing an image of the subject; an analog/digital converting section for converting an analog image signal obtained from the image capturing device to a digital image signal; and a signal processing apparatus according to the present invention, to which a digital image signal from the analog/digital converting section is inputted as the input image signal, thereby achieving the objective described above.

An electronic information device according to the present invention has a solid-state image capturing apparatus that includes the signal processing apparatus according to the present invention as an image input device in an image capturing section, thereby achieving the objective described above.

A signal processing method according to the present invention includes: a common pre-processing step of performing signal processing common to a photographed image process and a flicker detection process on a digital image signal obtained by digital converting an image signal from an image capturing device; a photographed image processing step of performing image signal processing on an image signal obtained by the common pre-processing step to generate a displayed image; a flicker detection pre-processing step of performing image signal processing on the image signal obtained by the common pre-processing step, for flicker detection; and a flicker detecting step of performing flicker detection, on the image signal obtained by the flicker detection pre-processing step, thereby achieving the objective described above.

Preferably, in a signal processing method according to the present invention, between a brightness frequency detecting step for detecting a spatial frequency of a brightness signal in a vertical direction of a displayed image and a color difference frequency detecting step for detecting a spatial frequency of a color difference signal in the vertical direction of the displayed image, the flicker detection step includes at least the brightness frequency detecting step.

Still preferably, in a signal processing method according to the present invention, the flicker detection pre-processing step includes at least a shading correcting step for correcting the image in a vertical direction between horizontal and vertical directions of an image.

Still preferably, in a signal processing method according to the present invention, the flicker detection pre-processing step includes a light and shade correcting step for correcting light and shade of a displayed image.

Still preferably, in a signal processing method according to the present invention, the flicker detection pre-processing step includes a shading correcting step of correcting a decrease of a peripheral light amount due to lens shading; a digital gain correcting step of correcting signal levels of three colors that vary due to a color temperature of a light source; an interpolation step of generating a brightness signal Y and color difference signals U and V from inputted primary RGB color signals; and a light and shade correcting step of correcting light and shade of a displayed image.

Still preferably, in a signal processing method according to the present invention, the flicker detection pre-processing step includes a shading correcting step of correcting a decrease of a peripheral light amount due to lens shading; a digital gain correcting step of correcting signal levels of three colors that vary due to a color temperature of a light source; and an interpolation step of generating a brightness signal Y and color difference signals U and V from inputted primary RGB color signals.

A control program according to the present invention records process steps for allowing a computer to execute at least the flicker detection pre-processing step and the flicker detecting step among the steps of the signal processing method according to the present invention, thereby achieving the objective described above.

A readable recording medium according to the present invention is computer-readable and stores the control program according to the present invention, thereby achieving the objective described above.

The functions of the present invention having the configurations described above will be described hereinafter.

According to the present invention, included are a common pre-processing section for performing a signal processing for an input image signal common to a process for generating a photographed image and a process for detecting a flicker; a photographed image processing section for performing image signal processing on the image signal from the common pre-processing section, to generate a photographed image; a flicker detection pre-processing section for performing image signal processing on the image signal from the common pre-processing section to prepare for flicker detection; and a flicker detecting section for performing a flicker detection based on the image signal from the flicker detection pre-processing section.

Therefore, a flicker detection pre-processing section is provided in a different system from the photographed image processing section and a different process is performed other than in the photographed image processing section in order to perform the flicker detecting process by the flicker detecting section. As a result, it becomes possible to detect a flicker frequency with high accuracy, without a harmful influence to a displayed image to be photographed.

In addition, it is also possible to achieve part or all of the processes using a software processing method.

According to the present invention with the configuration described above, a flicker detection pre-processing section is provided in a different system from the photographed image processing section and a different process is performed other than in the photographed image processing section in order to perform the flicker detecting process by the flicker detecting section. As a result, it becomes possible to detect a flicker frequency with high accuracy, without a harmful influence to a displayed image to be photographed.

These and other advantages of the present invention will become apparent to those skilled in the art upon reading and understanding the following detailed description with reference to the accompanying figures.

BRIEF DESCRIPTION OF THE DRAWINGS

FIG. 6(a) is an image illustrating a display screen showing a state where transverse stripes of a color difference due to flicker noise appear on the displayed image. FIG. 6(b) is a graph of a projection of the displayed image, of the levels of the RGB signals for each line in the horizontal direction. FIG. 6(c) is a graph of a projection of the color difference signal for each line in the horizontal direction.

Figure 1:
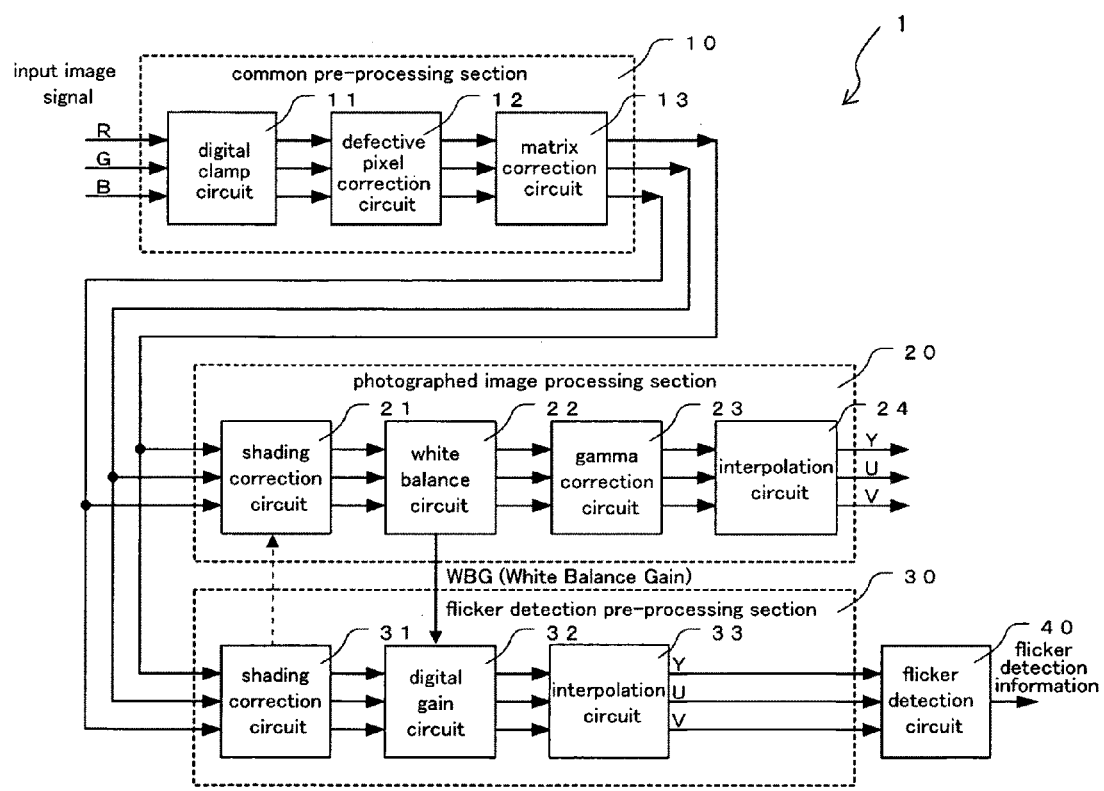
FIG. 1 is a block diagram illustrating an exemplary essential configuration of a signal processing apparatus according to Embodiment 1 of the present invention.

1, 1A, 1B, 1C, 1D signal processing apparatus
10 common pre-processing section
11 digital clamp circuit
12 defective pixel correction circuit
13 matrix correction circuit
20 photographed image processing section
21 shading correction circuit
22 white balance circuit
23 gamma correction circuit
24 interpolation circuit
30, 30B, 30C flicker detection pre-processing section
31, 31B shading correction circuit
32 digital gain circuit
33 interpolation circuit
34 light and shade and saturation correction circuit
40, 40A flicker detection circuit
41Y horizontal direction integration circuit (brightness Y component)
41U horizontal direction integration circuit (color difference U component)

41V horizontal direction integration circuit (color difference V component)
42Y frequency conversion circuit (brightness Y component)
42U frequency conversion circuit (color difference U component)
42V frequency conversion circuit (color difference V component)
43, 43A frequency detection circuit
50A signal processing apparatus
51 CPU (control section)
511 flicker detection pre-processing section
512 flicker detecting section
511a brightness change determining section
511b shading correcting section
511c digital gain correcting section
511d interpolation section
511e light and shade and saturation correcting section
52 operation section
53 display section
54 ROM (memory section)
55 RAM (memory section)
90 electronic information device
91 solid-state image capturing apparatus
92 memory section
93 display section
94 communication section
95 image output section

DESCRIPTION OF THE PREFERRED EMBODIMENTS

Hereinafter, embodiments of the present invention will be described with reference to the accompanying figures, with a signal processing apparatus having a hardware configuration of the present invention and a signal processing method as Embodiments 1 to 4; a signal processing apparatus having a part or all of a software configuration of the present invention and a signal processing method as Embodiment 5; and an electronic information device, such as a camera-equipped cell phone device, having the solid-state image capturing apparatus with any of the configurations according to Embodiments 1 to 5 as an image input device used in an image capturing section thereof as Embodiment 6.

Embodiment 1

FIG. 1 is a block diagram illustrating an exemplary essential configuration of a signal processing apparatus according to Embodiment 1 of the present invention.

In FIG. 1, a signal processing apparatus 1 according to Embodiment 1 includes a common pre-processing section 10 for performing image signal processing common for a photographed image and flicker detection; a photographed image processing section 20 for performing image signal processing for a photographed image; a flicker detection pre-processing section 30 for performing image signal processing for flicker detection; and a flicker detection circuit 40 for performing a flicker detection process based on an image signal from the flicker detection pre-processing section 30.

The common pre-processing section 10 includes, as an example, a digital clamp circuit 11 for performing a clamp process to set a black level of an input signal at a predetermined value; a defective pixel correction circuit 12 for correcting white defects, black defects, and fixed noise; and a matrix correction circuit 13 for improving spectral characteristics. The common pre-processing section 10 is inputted with a digital image signal as an input image signal, obtained by performing an analog/digital conversion on an image signal from an image capturing device, and the common pre-processing section 10 performs signal processing common to a photographed image and flicker detection, on the input image signal.

The photographed image processing section 20 includes, as an example, for photographed image processing, a shading correction circuit 21 for correcting a decrease of a peripheral light amount due to lens shading; a white balance circuit 22 for correcting gains of three colors that vary due to a color temperature of a light source; a gamma correction circuit 23 for adjusting an image signal in accordance with display characteristics of an image display apparatus and gradation characteristics of a sensor; and an interpolation circuit 24 for generating a brightness signal and a color difference signal from inputted primary RGB color signals.

The flicker detection pre-processing section 30 includes, as an example, a shading correction circuit 31 as a shading correcting section for correcting a decrease of a peripheral light amount due to lens shading, for a flicker detection; a digital gain circuit 32 for correcting signal levels of three colors that vary due to a color temperature of a light source; and an interpolation circuit 33 for generating a brightness signal Y, and color difference signals U and V from inputted primary RGB color signals.

The shading correction circuit 21 in the process of generating a photographed image, may perform a shading correction process in horizontal and vertical directions of an image; and the shading correction circuit 31 in the process for flicker detection, may perform a shading correction process in horizontal and vertical directions of an image. However, only the shading correction process in a vertical direction of an image is performed herein. The shading correction is only necessary in the vertical direction of an image (i.e., the signal level is planarized only in the longitudinal direction of a displayed screen) because integration is performed in a transverse (horizontal) direction of a displayed image for each line during the flicker detection. This will make it possible to prevent the size of the circuit from being increased and to obtain an effect similar to the shading corrections in both directions.

Furthermore, the circuit size of the shading correction circuit 21 can be further reduced when the shading correction process is performed in the vertical direction of an image by the shading correction circuit 31, the shading correction process is performed in the horizontal direction of the image by the shading correction circuit 21 and multiplication is performed utilizing the shading correction circuit 31. In addition, a shading correction circuit only for the vertical direction of an image may be included in the common pre-processing section 10, and its data may be inputted to the photographed image processing section 20 and the flicker detection pre-processing section 30, and a shading correction process in only the horizontal direction of an image may be further performed by the photographed image processing section 20 and multiplication may be performed for both.

Figure 2:
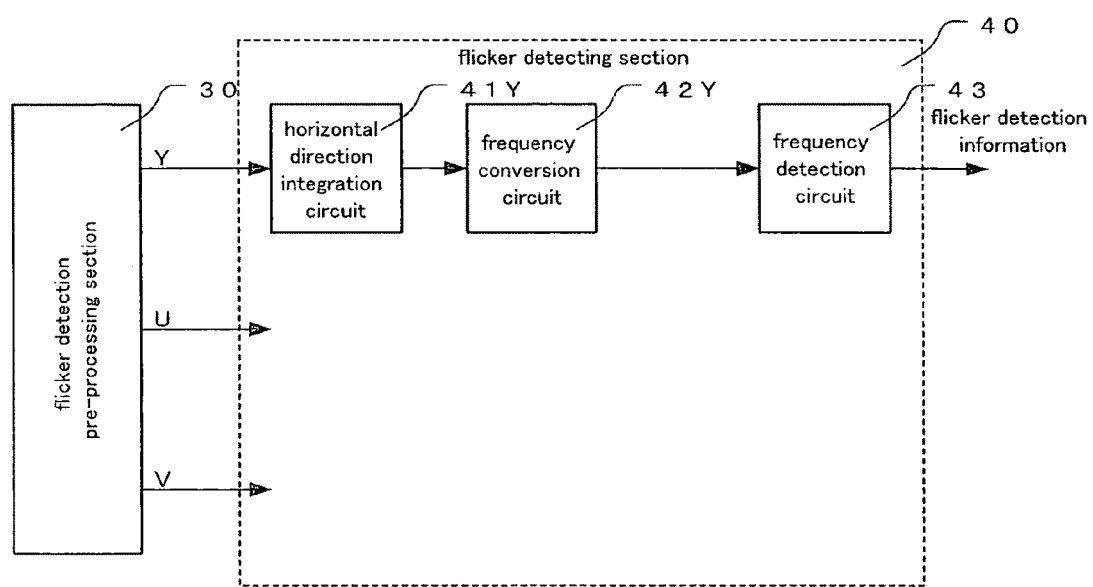
FIG. 2 is a block diagram illustrating an exemplary essential configuration of a flicker detection circuit of FIG. 1.

As illustrated in FIG. 2, the flicker detection circuit 40 includes a horizontal direction integration circuit 41Y for integrating a brightness signal among image signals from the interpolation circuit 33, for each line in the horizontal direction; a frequency conversion circuit 42Y for performing a process such as a discrete Fourier transform on an integration value that is integrated by the horizontal direction integration circuit 41Y; and a frequency detection circuit 43 for detecting a spatial frequency at which a power of the signal is at a maximum, based on a result of a process of the discrete Fourier transform. The flicker detection circuit 40 detects an alternating current source frequency (50 Hz or 60 Hz) of a fluorescent light from flicker noise that exists in an output signal of the flicker detection pre-processing section 30.

Figure 3:
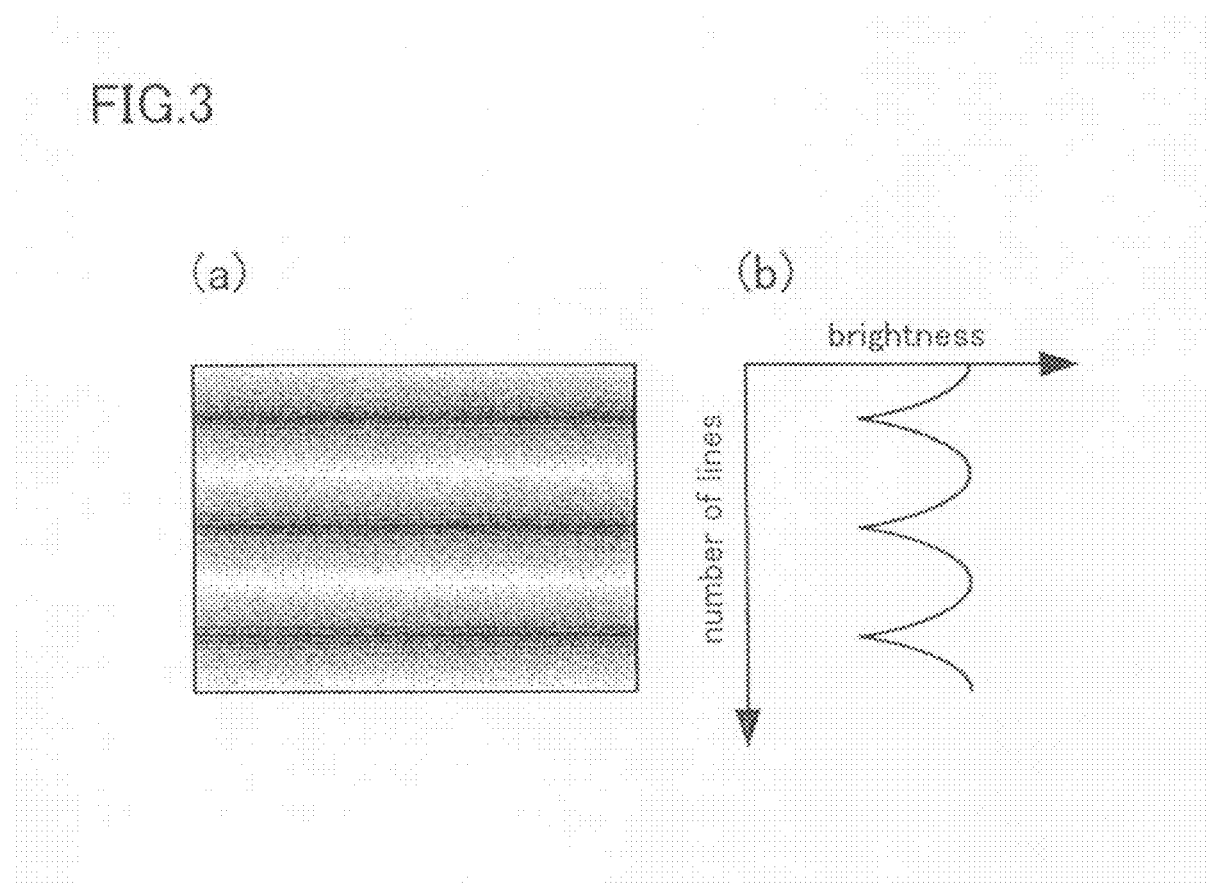
FIG. 3(a) is an image illustrating a display screen showing a state where transverse stripes of brightness due to flicker noise appear on the displayed image.
FIG. 3(b) is a graph of a projection of the displayed image, of the brightness signal level for each line in the horizontal direction.

An exemplary method for detecting a flicker will be described in detail with reference to FIG. 3.

FIG. 3(a) illustrates a displayed image and the displayed image shows a state of transverse stripes of brightness appearing due to flicker noise. FIG. 3(b) illustrates a horizontal projection of the displayed image (display screen), illustrating a variation of light having an absolute value of the variation as a result of the alternating current source voltage of a fluorescent light. This frequency corresponds to a value of twice the alternating current source frequency (100 Hz or 120 Hz). As a projection of the displayed image in the horizontal direction, the horizontal direction integration circuit 41Y integrates the image signal for each line in the horizontal direction, and the frequency conversion circuit 42Y performs a process such as the discrete Fourier transform to the integrated value, and the frequency detection circuit 43 detects a spatial frequency at which a power of the signal is at a maximum, based on a result of a process of the discrete Fourier transform. As a result, a spatial frequency in the vertical direction can be determined for a displayed image corresponding to the transverse stripes, and an alternating current source frequency of a fluorescent light, which can be a cause of flicker noise, can be detected.

In addition, a flicker does not occur when a shutter speed and an integral multiple of one cycle of a flicker correspond to each other. Therefore, flicker noise can be reduced by a method for setting the shutter speed to be an integral multiple of an alternating current source frequency by a shutter speed control circuit (not shown) based on an alternating current source frequency information that is determined by the flicker detection circuit 40; or a method for raising a gain of a line that has a low signal level by a digital gain circuit.

Embodiment 2

In Embodiment 1 described above, a case is described where, a flicker detection is performed using brightness signal information, in the flicker detection circuit 40. Without the limitation to this, in Embodiment 2 described later, a case will be described where a flicker detection is performed using color difference signal information, in addition to the brightness signal information.

Figure 4:
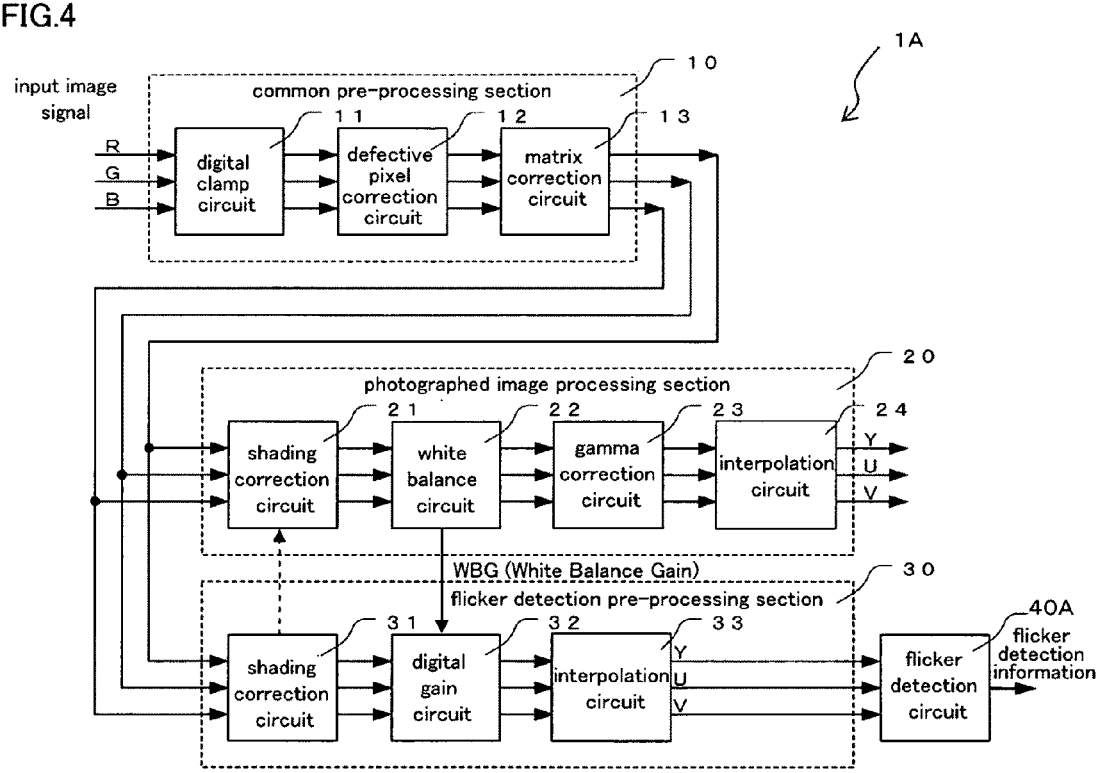
FIG. 4 is a block diagram illustrating an exemplary essential configuration of a signal processing apparatus according to Embodiment 2 of the present invention.

FIG. 4 is a block diagram illustrating an exemplary essential configuration of a signal processing apparatus according to Embodiment 2 of the present invention. In FIG. 4, the members having the same function and effect as the corresponding ones in FIG. 1 are added with the same reference numerals, but their explanations will be omitted.

In FIG. 4, a signal processing apparatus 1A according to Embodiment 2 includes a common pre-processing section 10 for performing image signal processing common for a photographed image and flicker detection; a photographed image processing section 20 for performing image signal processing for a photographed image; a flicker detection pre-processing section 30 for performing image signal processing before flicker detection; and a flicker detection circuit 40A as a flicker detecting section for performing a flicker detection process based on an image signal from the flicker detection pre-processing section 30.

The flicker detection circuit 40A performs flicker detection using both brightness signal information and color difference signal information of an image signal from the flicker detection pre-processing section 30.

Figure 5:
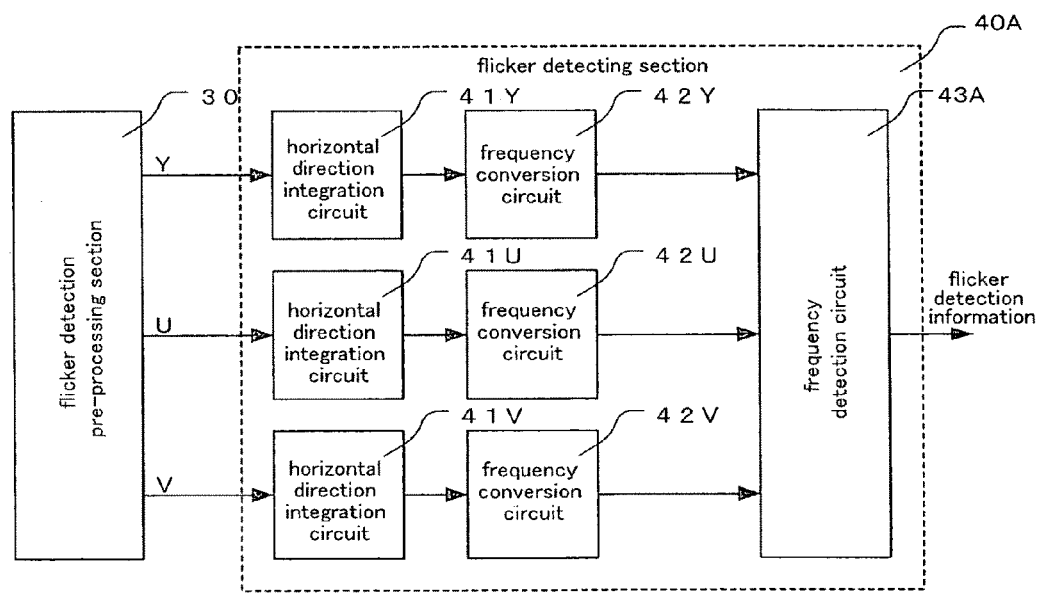
FIG. 5 is a block diagram illustrating an exemplary essential configuration of a flicker detection circuit of FIG. 4.

As illustrated in FIG. 5, the flicker detection circuit 40A includes a horizontal direction integration circuit 41Y for integrating a brightness signal among image signals from a interpolation circuit 33, for each line in the horizontal direction; a frequency conversion circuit 42Y for performing a process such as a discrete Fourier transform on an integration value that is integrated at the horizontal direction integration circuit 41Y; a horizontal direction integration circuit 41U for integrating a color difference signal U among image signals from the interpolation circuit 33, for each line in the horizontal direction; a frequency conversion circuit 42U for performing a process such as a discrete Fourier transform on an integration value that is integrated at the horizontal direction integration circuit 41U; a horizontal direction integration circuit 41V for integrating a color difference signal V among image signals from the interpolation circuit 33, for each line in the horizontal direction; a frequency conversion circuit 42V for performing a process such as a discrete Fourier transform on an integration value that is integrated at the horizontal direction integration circuit 41V; and a frequency detection circuit 43A for detecting a spatial frequency at which a power of the signal is at a maximum, based on each result of a process of the discrete Fourier transform. The flicker detection circuit 40A detects an alternating current source frequency of a fluorescent light from flicker noise that exists in an output signal of the flicker detection pre-processing section 30. Note that the integration is performed horizontally and the discrete Fourier transform is performed vertically.

FIG. 6(a) illustrates a displayed image and the displayed image shows a state of transverse stripes of color differences appearing due to flicker noise. FIG. 6(b) illustrates a projection of the displayed image, of the levels of the RGB signals in the horizontal direction. FIG. 6(c) illustrates a projection of a displayed image, of a color difference signal for each line in the horizontal direction, and includes a spatial frequency that is twice the alternating current source frequency (100 Hz or 120 Hz), similar to the brightness flicker noise. As a projection of the displayed image for each line in the horizontal direction, in addition to the horizontal direction integration circuit 41Y, the horizontal direction integration circuits 41U and 41V respectively integrate the image signal for each line in the horizontal direction of the displayed image. In addition to the frequency conversion circuit 42Y, the frequency conversion circuits 42U and 42V perform a process such as discrete Fourier transform. The frequency detection circuit 43 detects a spatial frequency at which each power of the brightness signal Y and color difference signals U and V is at its maximum. As a result, a spatial frequency of the vertical direction of the image corresponding to the transverse stripes can be determined, and an alternating current source frequency (100 Hz or 120 Hz) of a fluorescent light, which can cause flicker noise, can be detected. In this case, a flicker frequency is specified based on the information from the frequency conversion circuits 42Y, 42U and 42V, and the flicker frequency is finally determined by a majority rule. In summary, even if a detection result does not come out to one of the circuits, the detection results of the other two circuits can be adopted. In addition, even if a detection result does not come out to two of the circuits, the detection result of the remaining one circuit can be adopted.

When it is desired to reduce the size of the flicker detection circuit, the flicker detection can be performed by using only the brightness signal information, similar to the flicker detection circuit 40 according to Embodiment 1. In addition, when it is desired to increase the flicker detection accuracy by further preventing error in detection, the flicker detection with a high reliability can be performed by using the color difference signal information in addition to the brightness signal information to increase the amount of information, similar to the flicker detection circuit 40A according to Embodiment 2.

Embodiment 3

With regard to the shading correction circuit 31 of the flicker detection pre-processing section 30 described in Embodiment 1, Embodiment 3 will describe a case where 100 percent of the shading correction pre-process is performed, such that a periphery part will be planarized regardless of the amplitude of noise.

Figure 7:
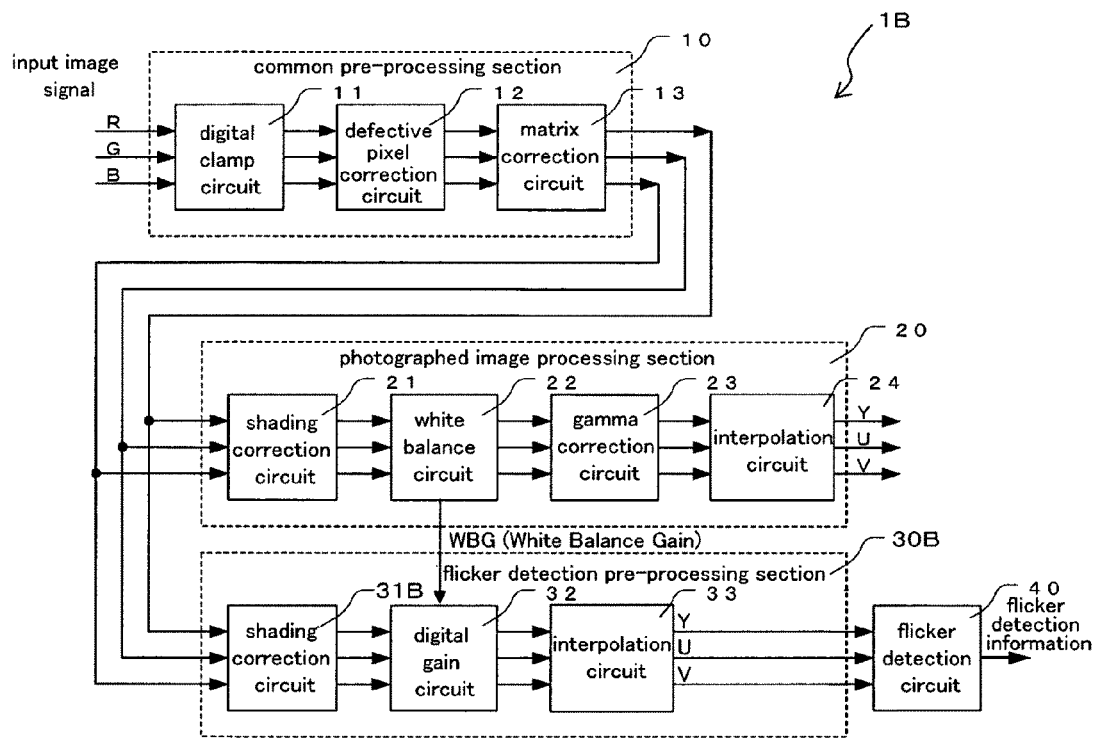
FIG. 7 is a block diagram illustrating an exemplary essential configuration of a signal processing apparatus according to Embodiment 3 of the present invention.

FIG. 7 is a block diagram illustrating an exemplary essential configuration of a signal processing apparatus according to Embodiment 3 of the present invention. In FIG. 7, the members having the same function and effect as the corresponding ones in FIG. 1 are added with the same reference numerals, but their explanations will be omitted.

In FIG. 7, a signal processing apparatus 1B according to Embodiment 3 includes a common pre-processing section 10 for performing image signal processing common for a photographed image and flicker detection; a photographed image processing section 20 for performing image signal processing for a photographed image; a flicker detection pre-processing section 30B for performing image signal processing for flicker detection; and a flicker detection circuit 40 as a flicker detecting section for performing a flicker detection process based on an image signal from the flicker detection pre-processing section 30B.

The flicker detection pre-processing section 30B includes, as an example, a shading correction circuit 31B for flicker detection processing, for correcting a decrease of a peripheral light amount due to lens shading; a digital gain circuit 32 for correcting signal levels of three colors that vary due to a color temperature of a light source; and an interpolation circuit 33 for generating a brightness signal and a color difference signal from inputted primary RGB color signals.

The shading correction circuit 31B performs 90 to 100 percent (100 percent, herein) of shading correction pre-process in such a manner to planarize from the middle part to the peripheral part of the display screen (i.e., signal level is equal).

The shading correction circuit 21 performs 70 to 80 percent of the shading correction process in the horizontal and vertical directions of an image on a photographed image. The shading correction circuit 31 for flicker detection processing, performs 100 percent of the shading correction process only in the vertical direction of an image. This is because integration is successively done for each line in the horizontal direction of the display screen at the time of the flicker detection and the shading correction is necessary only in the vertical direction of the image (i.e., it is only necessary to planarize the longitudinal direction), and thereby preventing the circuit size from being increased and obtaining a similar effect.

In summary, although a shading correction (100 percent correction) is not performed in such a manner to planarize from the middle part to the peripheral part of the display screen (i.e., the signal level is constant) for reasons of the image quality (it is reduced to 70 to 80 percent of the shading correction for displayed image) since the noise component N increases in the peripheral part compared to the middle part of the displayed image, 100 percent of the shading correction is performed to detect a flicker. When the 100 percent shading correction is performed both in the horizontal direction and the vertical direction of the image, the size of the circuit increases. Herein, since integration is performed for each line in the horizontal direction at the time of flicker detection, the 100 percent shading correction is only necessary in the vertical direction of the image (i.e., it is only necessary to planarize the longitudinal direction). As a result, the circuit size can be prevented from being increased, and a similar effect can be obtained as the case where the shading correction is performed in both directions.

Figure 8:
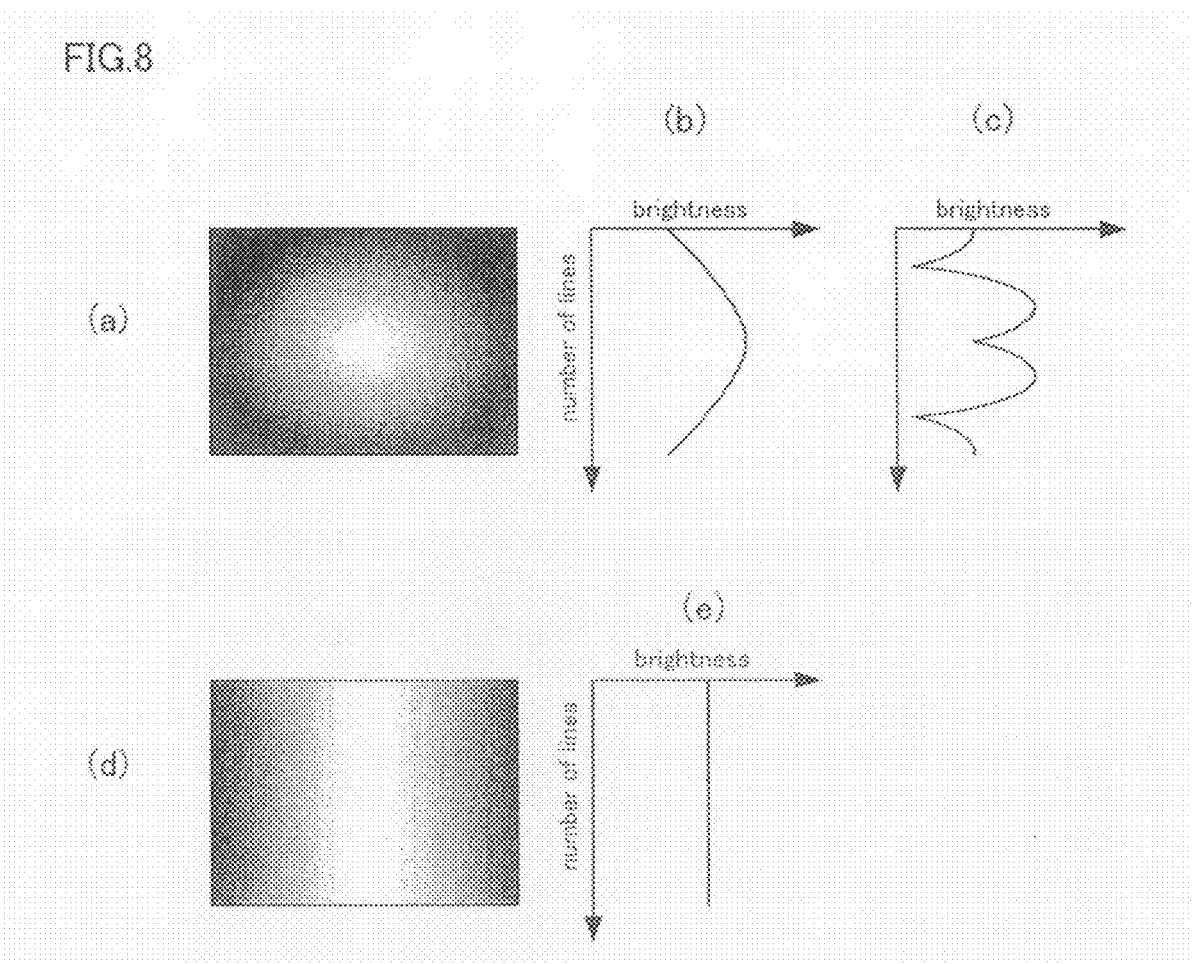
FIGS. 8(a) to 8(e) each are an illustration describing reduction of an influence of lens shading.

FIG. 8(a) illustrates a state where a decrease of a peripheral light amount due to a lens shading appears in a displayed image. FIG. 8(b) illustrates a projection of the brightness value in the horizontal direction of the displayed image. When the displayed image is overlapped with a flicker noise as illustrated in FIG. 3(b), the projection becomes as illustrated in FIG. 8(c). In this case, a spatial frequency due to the lens shading and a spatial frequency due to the flicker noise coexist, and it becomes difficult to separate the two main causes when the frame rate increases, in particular, because the number of bright and dark lines, that are the transverse stripes of the flicker noise decreases. This may cause an error in detection.

Therefore, as a pre-process of the flicker detection, the shading correction is performed to planarize from the middle part to the peripheral part of the display screen, so that the separation of the main causes will be easy and the accuracy of the flicker frequency detection can be increased.

As previously described, it is possible to achieve the effect by performing the shading correction only in the vertical direction of the displayed image (longitudinal direction), and therefore, it is effective for the reduction of the circuit size. In this case, the displayed image after the shading correction is as illustrated in FIG. 8(d), and the projection is planarized as illustrated in FIG. 8(e).

Although not specifically described in Embodiment 3, it is possible to use the flicker detection circuit 40A according to Embodiment 2 instead of the flicker detection circuit 40.

Embodiment 4

In order to increase the flicker detection accuracy in the flicker detection pre-processing section 30 illustrated in Embodiment 1 described above, a light and shade and saturation correction circuit will be newly added in Embodiment 4, and a case will be described where a light and shade and saturation correction pre-process is performed to emphasize light and shade and saturation, regardless of the influence to a displayed image presented to a user.

Figure 9:
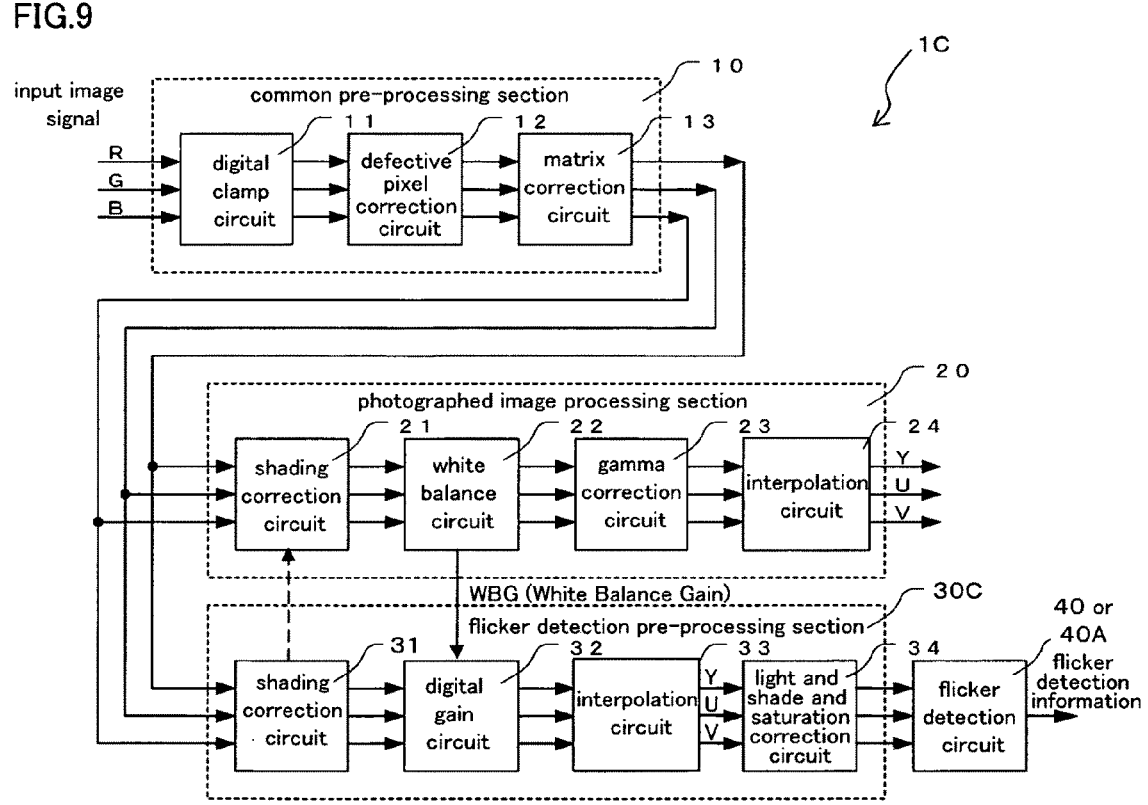
FIG. 9 is a block diagram illustrating an exemplary essential configuration of a signal processing apparatus according to Embodiment 4 of the present invention.

FIG. 9 is a block diagram illustrating an exemplary essential configuration of a signal processing apparatus according to Embodiment 4 of the present invention. In FIG. 9, the members having the same function and effect as the corresponding ones in FIG. 1 are added with the same reference numerals, but their explanations will be omitted.

In FIG. 9, a signal processing apparatus 1C according to Embodiment 4 includes a common pre-processing section 10 for performing image signal processing common for a photographed image and flicker detection; a photographed image processing section 20 for performing image signal processing for a photographed image; a flicker detection pre-processing section 30C for performing image signal processing for flicker detection; and a flicker detection circuit 40 or 40A as a flicker detecting section for performing a flicker detection process based on an image signal from the flicker detection pre-processing section 30C.

The flicker detection pre-processing section 30C includes, as an example, a shading correction circuit 31 for correcting a decrease of a peripheral light amount due to lens shading, for a flicker detection; a digital gain circuit 32 for correcting signal levels of three colors that vary due to a color temperature of a light source; an interpolation circuit 33 for generating a brightness signal and a color difference signal from inputted primary RGB color signals; and a light and shade and saturation correction circuit 34 as a light and shade correcting section for adjusting gradation characteristics of light and shade and saturation of an image.

Figure 10:
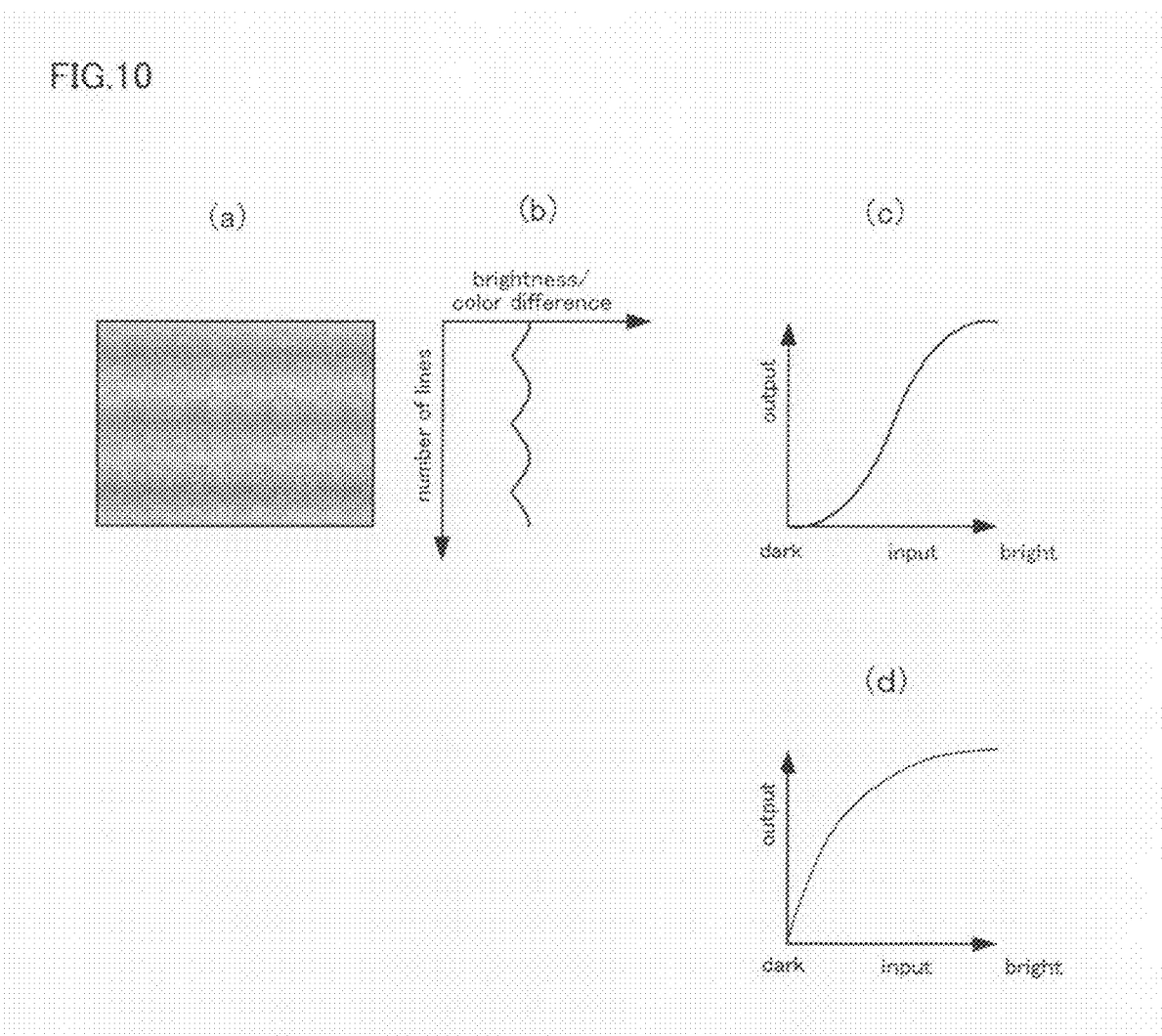
FIGS. 10(a) to 10(d) each are an illustration describing improvement of the accuracy of a flicker detection by light and shade and saturation correction.

As illustrated by the S-shaped curve in FIG. 10(c), the light and shade and saturation correction circuit 34 outputs a brighter output signal as the input signal becomes brighter, and outputs a darker output signal as the input signal becomes darker. On the other hand, as illustrated by the curve in FIG. 10(d), the gamma correction circuit 23 of the photographed image processing section 20 outputs a brighter output signal as the input signal becomes darker, and outputs an output signal, in which the brightness is hardly changed, for a bright input signal.

As described above, the light and shade and saturation correction circuit 34 is provided in the flicker detection pre-processing section 30C, so that the contrast is emphasized, and an image data, in which the displayed image is processed to emphasize the light and shade due to a flicker, is desirable for the flicker detection. However in terms of the image quality, it is obvious that it is improper for such a process to emphasize the light and shade to exist during the image signal processing of the photographed image processing section 20, for generating the photographed image. Therefore, it is preferable to provide the light and shade and saturation correction circuit 34 in the flicker detection pre-processing section 30C for the flicker detection circuit 40 or 40A.

In order to improve the detection accuracy by a brightness and color difference correction, one example of the pre-process will be described with reference to FIGS. 10(a) and 10(b). When a very weak flicker noise is appearing as illustrated in FIG. 10(a), a projection of the brightness and color difference in the horizontal direction will be one with a low amplitude as illustrated in FIG. 10(b).

Therefore, as a pre-process of the flicker detection, a light and shade and saturation correction process, which has the S-shaped characteristic as illustrated in FIG. 10(c), is performed on the displayed image by the light and shade and saturation correction circuit 34. As a result, a displayed image having a flicker noise amplitude as illustrated in FIGS. 3 and 6 will be generated and the accuracy of the flicker frequency detection can be increased.

Embodiment 5

It is possible to achieve part or all of each of the processes according to Embodiments 1 to 4 described above in a software process. In Embodiment 5, a case will be described where part or all of the signal processing apparatus according to the present invention is a software configuration.

Figure 11:
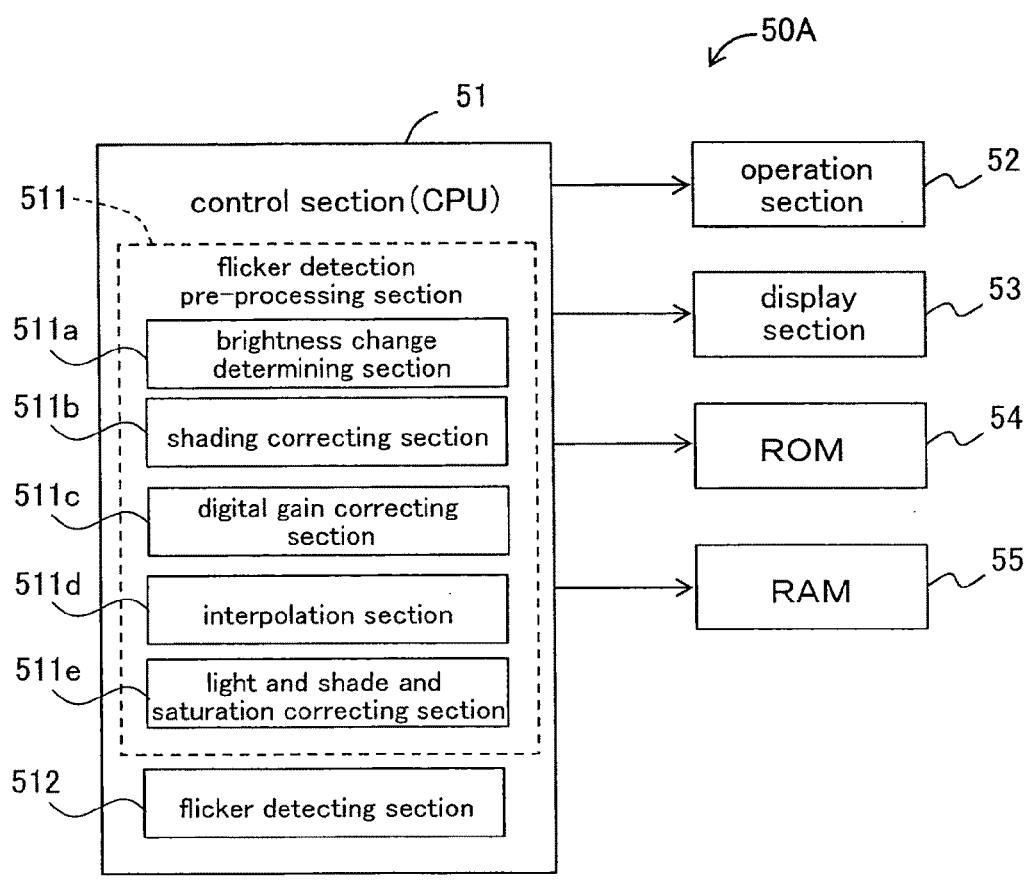
FIG. 11 is a block diagram illustrating an exemplary essential computer hardware configuration of a signal processing apparatus according to Embodiment 5 of the present invention.

FIG. 11 is a block diagram illustrating an exemplary essential computer hardware configuration of a signal processing apparatus according to Embodiment 5 of the present invention.

In FIG. 11, a signal processing apparatus 50A according to Embodiment 5 includes a CPU (central processing unit) 51 as a control section for an overall control; an operation section 52 such as an input apparatus for receiving input via a keyboard, a mouse, a touch panel and a pen input apparatus for performing an input instruction to the CPU 51, and further via a communication network (such as the Internet and Intranet); a display section 53 for displaying an initial screen, a selection screen, a control result screen and an operation input screen by the CPU 51, and the like on a display screen; a ROM 54 as a readable recording medium that is computer-readable and in which a control program and its data are stored; and a RAM 55 as a recording section that operates as a work memory for reading out and storing data for each control step processed by the CPU 51.

In addition to a hard disk, the ROM 54 as a readable recording medium, may be configured of an optical disk, a magneto-optical disk, a magnetic disk, an IC memory, or the like, which can be of any form. The control program and its data are recorded in the ROM 54; however, the control program and its data may be downloaded to the ROM 54 from other readable recording medium, or via wireless, wire or the Internet.

The CPU 51, as a control section, executes, based on the control program and its data, a flicker detection pre-processing section 511 for performing image signal processing to detect a flicker, and executes a flicker detecting section 512 for performing a flicker detection process based on an image signal from the flicker detection pre-processing section 511.

The flicker detection pre-processing section 511 includes a brightness change determining section 511a for determining whether the brightness is changed by an amount equal to or more than a predetermined value before starting a flicker detection pre-process; a shading correcting section 511b for flicker detection processing, for correcting a decrease of a peripheral light amount due to lens shading; a digital gain correcting section 511c for correcting signal levels of three colors that vary due to a color temperature of a light source; an interpolation section 511d for generating a brightness signal Y, and color difference signals U and V, from inputted primary RGB color signals; and a light and shade and saturation correcting section 51e for adjusting gradation characteristics of light and shade and saturation of an image. Note that there may be a case where the light and shade and saturation correcting section 51e is not included.

Herein, the flicker detection process can be processed after a relative elapse of time (slow speed process), a software process is used as the flicker detection process by the flicker detection pre-processing section 511 and the flicker detecting section 512 (which correspond to the flicker detection pre-processing section 30, 30B or 30C described above, and the flicker detection circuit 40 or 40A described above). However, with regard to the common pre-processing section 10 and the photographed image processing section 20 in FIG. 1, hardware process similar to the case of FIG. 1 is used herein. If a high speed process is not considered, a software process can also be used for the common pre-processing section 10 and the photographed image processing section 20 in FIG. 1.

Herein, a signal processing apparatus ID according to Embodiment 5 includes a hardware processing section of the common pre-processing section 10 and the photographed image processing section 20 in FIG. 1; and a software processing section of the flicker detection pre-processing section 511 and the flicker detecting section 512.

The operation will be described with the configuration described above.

Figure 12:
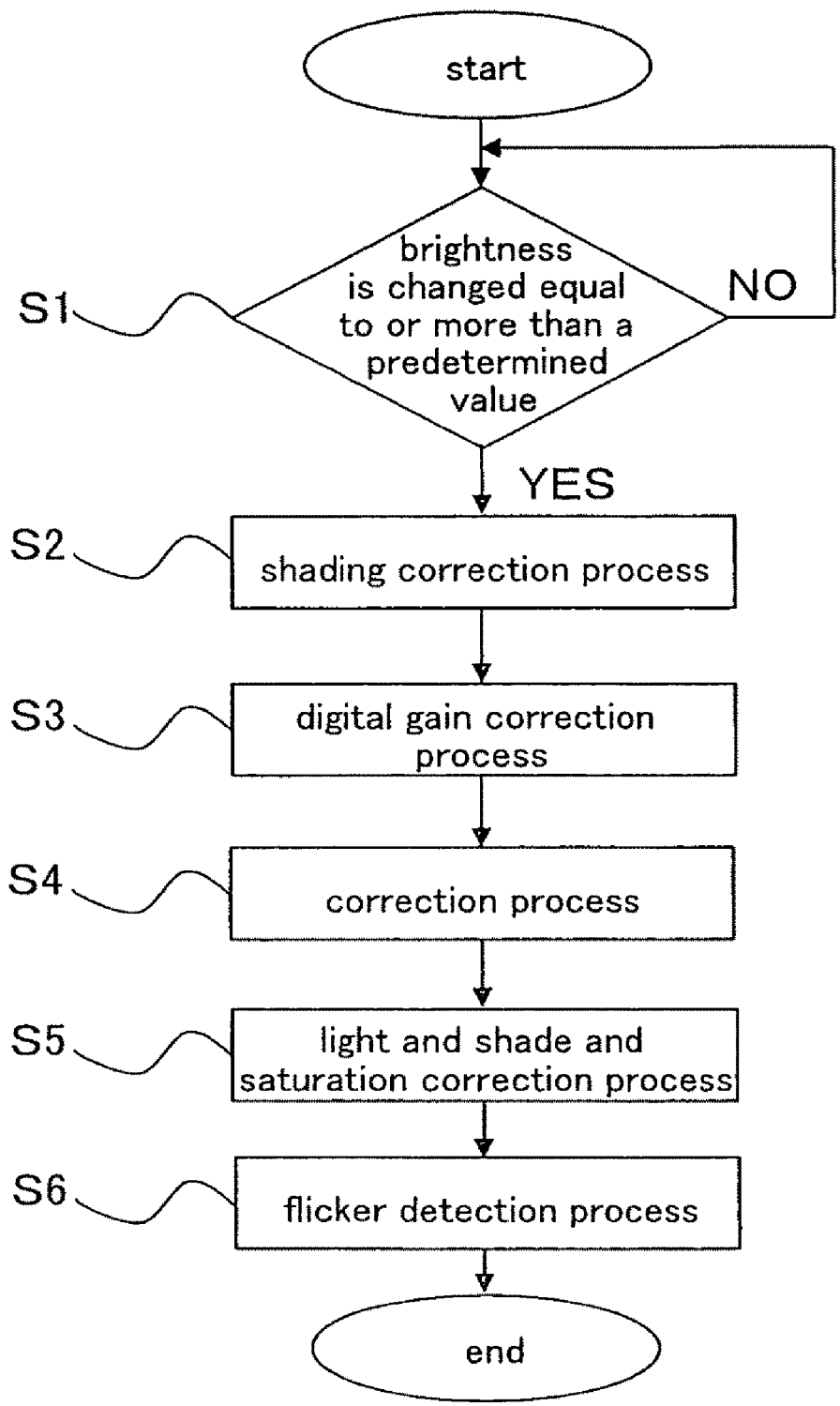
FIG. 12 is a flowchart describing an operation of a signal processing apparatus of FIG. 11.

FIG. 12 is a flowchart describing an operation of a signal processing apparatus 50A of FIG. 11.

As illustrated in FIG. 12, first, the brightness change determining section 511a determines whether the brightness is changed by an amount equal to or more than a predetermined value in step S1. When the brightness is changed by an amount equal to or more than a predetermined value, the flicker detection pre-process starts, and the process moves to the following step S2. The detection of the brightness is performed by taking a predetermined number of frames to detect the brightness of a predetermined middle part area of a display screen.

Next, in step S2, the shading correcting section 511*b* corrects a decrease of a peripheral light amount due to lens shading, for flicker detection.

Subsequently, in step S3, the digital gain correcting section 511*c* corrects signal levels of three colors that vary due to a color temperature of a light source.

Further, in step S4, the interpolation section 511*d* generates a brightness signal Y, and color difference signals U and V, from inputted primary RGB color signals.

Subsequently, in step S5, the light and shade and saturation correcting section 511*e* adjusts gradation characteristics of light and shade and saturation of an image to emphasize the contrast.

Further, in step S6, the flicker detecting section 512 performs a flicker detecting process based on an image signal from the flicker detection pre-processing section 511.

In Embodiments 1 to 5 described above, examples by a CMOS type image capturing device are described. However, without the limitation to this, the examples can be applied to an image capturing device that performs an exposure of a line as a unit. In addition, in Embodiments 1 to 5 described above, examples with a primary color filter are described. However, without the limitation to this, the examples can be applied to an image capturing device that uses a complementary color filter.

Embodiment 6

Figure 13:
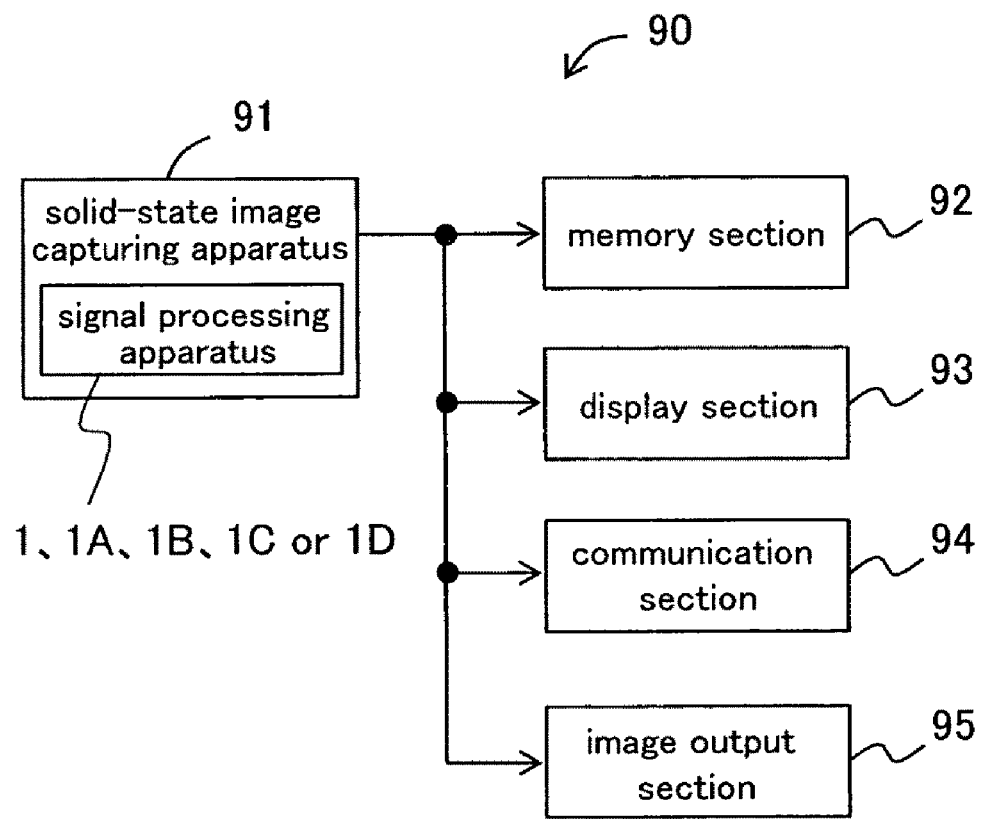
FIG. 13 is a block diagram schematically illustrating an exemplary configuration of an electronic information device, as Embodiment 6 of the present invention, using a solid-state image capturing apparatus that includes the signal processing apparatus according to any of Embodiments 1 to 5 of the present invention, in an image capturing section.
Figure 14:
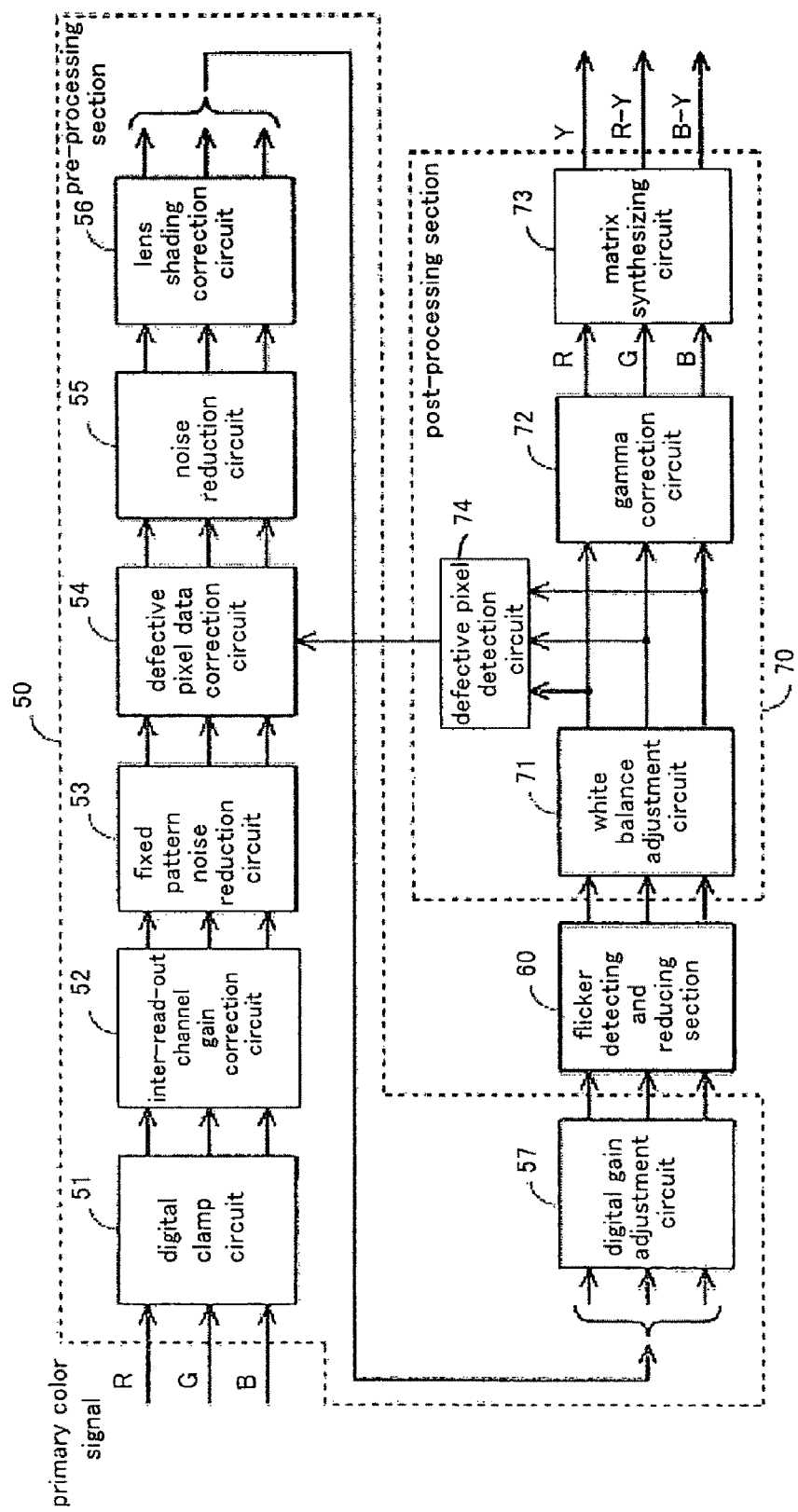
FIG. 14 is a block diagram illustrating an exemplary essential configuration of a conventional digital signal processing apparatus disclosed in Reference 1.
Figure 15:
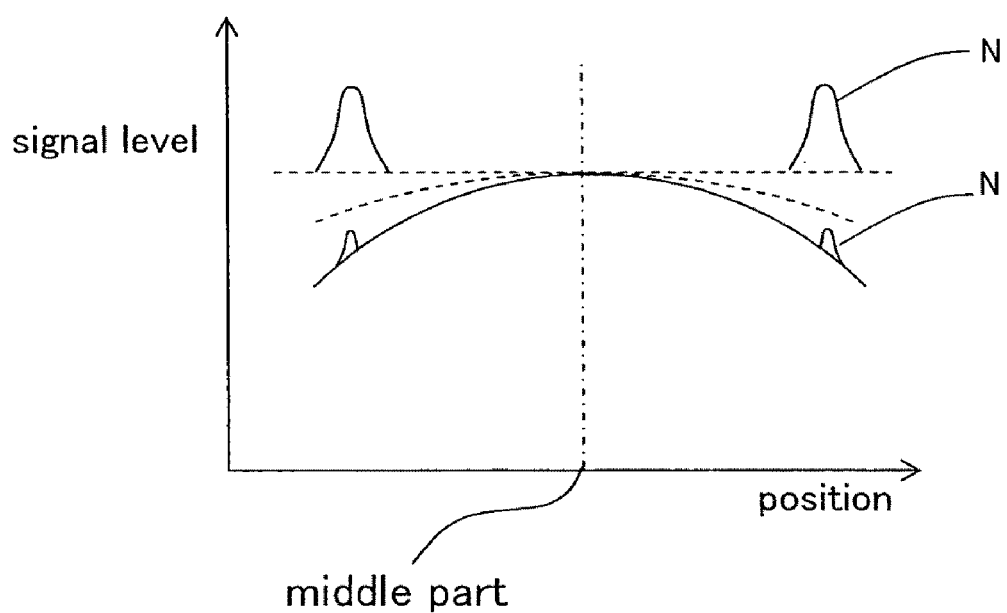
FIG. 15 is a graph illustrating a case where noise increases due to a lens shading correction.

FIG. 13 is a block diagram schematically illustrating an exemplary configuration of an electronic information device, as Embodiment 6 of the present invention, using a solid-state image capturing apparatus that includes the signal processing apparatus according to any of Embodiments 1 to 5 of the present invention, in an image capturing section.

In FIG. 13, a solid-state image capturing apparatus 91 according to Embodiment 6 includes an image capturing device (not shown) having therein a plurality of light receiving sections for performing photoelectric conversions thereon and capturing an image of light from a subject; an analog/digital converting section (not shown) for converting an analog image signal obtained from the image capturing device to a digital image signal; and a signal processing apparatus 1, 1A, 1B, 1C or 1D to which a digital image signal from the analog/digital converting section is inputted as the input image signal.

An electronic information device 90 according to Embodiment 6 of the present invention includes: a solid-state image capturing apparatus 91 for performing various signal processing on an image signal from the signal processing apparatus 1, 1A, 1B, 1C or 1D according to any of Embodiments 1 to 5, which processes an image capturing signal from the image capturing device (not shown), so as to obtain a color image signal; a memory section 92 (e.g., recording media) for data-recording a color image data from the solid-state image capturing apparatus 91 after a predetermined signal process is performed on the image data for recording; a display section 93 (e.g., a liquid crystal display apparatus) for displaying an image based on the color image data from the solid-state image capturing apparatus 91 on a display screen (e.g., liquid crystal display screen) after predetermined signal processing is performed on the color image data for display; a communication section 94 (e.g., a transmitting and receiving device) for communicating the color image signal from the solid-state image capturing apparatus 91 after predetermined signal processing is performed on the image signal for communication; and an image output section 95 for printing the image based on the color image signal from the solid-state image capturing apparatus 91 after predetermined signal processing is performed for printing. Thus, without any limitations to this, the electronic information device 90 may include any of the memory section 92, the display section 93, the communication section 94, and the image output section 95, in addition to the solid-state image capturing apparatus 91.

As the electronic information device 90, an electronic device that includes an image input device is conceivable, such as a digital camera (e.g., digital video camera and digital still camera), an image input camera (e.g., a monitoring camera, a door phone camera, a camera equipped in a vehicle, and a television telephone camera), a scanner, a facsimile machine, a television telephone device, a camera-equipped cell phone device and a personal digital assistant (PDA).

Therefore, according to Embodiment 6 of the present invention, information based on the color image signal from the solid-state image capturing apparatus 91 can be: displayed on a display screen finely, printed out on a sheet of paper using an image output section 95, communicated finely as communication data via a wire or a radio, stored finely at the memory section 92 by performing predetermined data compression processing; and various data processes can be finely performed.

As described above, according to Embodiments 1 to 5, included are a common pre-processing section 10 for performing image signal processing common for a photographed image and flicker detection; a photographed image processing section 20 for performing image signal processing for a photographed image, to the image signal from the common pre-processing section 10; a flicker detection pre-processing section 30 for performing image signal processing for flicker detection, to the image signal from the common pre-processing section 10; and a flicker detection circuit 40 for performing a flicker detection, based on an image signal from the flicker detection pre-processing section 30. Consequently, when the flicker detection process is performed in the flicker detection circuit 40, the flicker detection pre-processing section 30, which is a process system provided in addition to the photographed image processing section 20, performs a process separated from the photographed image processing section 20, so that a flicker frequency can be detected with a high accuracy, without influencing the displayed image for image photographing.

Although not specifically described in Embodiments 1 to 6, the features of Embodiments 1 to 5 can be combined appropriately. That is, it is possible to configure the present invention by including any of the flicker detection circuit 40 (Embodiment 1) or the flicker detection circuit 40A (Embodiment 2), the shading correction circuit 31 or the shading correction circuit 31B (Embodiment 3), and the light and shade and saturation correction circuit 34 (Embodiment 4).

Although not specifically described in Embodiments 1 to 6, the emission characteristic and the afterglow characteristic of a fluorescent substance differ depending on the color of the fluorescent substance, and the color changes together with the degree of the brightness when a shutter speed is fast. Therefore, transverse stripes of color may occur as similar to the transverse stripes that occurs with the change of the brightness. Conventionally, this information is not utilized for the flicker detection, and therefore, it is necessary to utilize this information for the improvement of the accuracy of the flicker detection.

As described above, the present invention is exemplified by the use of its preferred Embodiments 1 to 6. However, the present invention should not be interpreted solely based on Embodiments 1 to 6 described above. It is understood that the scope of the present invention should be interpreted solely based on the claims. It is also understood that those skilled in the art can implement equivalent scope of technology, based on the description of the present invention and common knowledge from the description of the detailed preferred Embodiments 1 to 6 of the present invention. Furthermore, it is understood that any patent, any patent application and any references cited in the present specification should be incorporated by reference in the present specification in the same manner as the contents are specifically described therein.

INDUSTRIAL APPLICABILITY

The present invention can be applied in the field of a signal processing apparatus for detecting a flicker from an image signal obtained from a CMOS (Complementary Metal Oxide Semiconductor) type image capturing device and the like, which performs photoelectric conversions thereon and capturing an image of light from a subject; a signal processing method; a control program including processing steps for allowing a computer to execute each step of the signal processing method; a computer-readable recording medium storing the control program as data; a solid-state image capturing apparatus having the signal processing apparatus used therein; and an electronic information device, such as a digital camera (e.g., a digital video camera and a digital still camera), an image input camera, a scanner, a facsimile machine, and a camera-equipped cell phone device, having the solid-state image capturing apparatus with the signal processing apparatus as an image input device used in an image capturing section thereof. According to the present invention, a flicker detection pre-processing section is provided in a different system from the photographed image processing section and a different process is performed other than the photographed image processing section in order to perform the flicker detecting process by the flicker detecting section. As a result, it becomes possible to detect a flicker frequency with high accuracy, without a harmful influence to a displayed image to be photographed.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A signal processing apparatus, comprising:
   a common pre-processing section, for performing signal processing common to a photographed image process and a flicker detection process, on an input image signal;
   a photographed image processing section for performing image signal processing on an image signal from the common pre-processing section to generate a displayed image;
   a flicker detection pre-processing section for performing image signal processing on the image signal from the common pre-processing section for flicker detection; and
   a flicker detecting section for performing flicker detection based on the image signal from the flicker detection pre-processing section,
   wherein the photographed image processing section comprises a first shading correcting section,
   wherein the flicker detection pre-processing section comprises a second shading correcting section,
   and wherein data from the first and second shading correcting sections is combined.

2. A signal processing apparatus according to claim 1, wherein the flicker detecting section performs flicker detection by using brightness signal information of an image signal from the flicker detection pre-processing section.

3. A signal processing apparatus according to claim 1, wherein the flicker detecting section performs flicker detection by using brightness signal information and color difference signal information of an image signal from the flicker detection pre-processing section.

4. A signal processing apparatus according to claim 2, wherein, between a brightness frequency detecting section for detecting a spatial frequency of a brightness signal in a vertical direction of an image and a color difference frequency detecting section for detecting a spatial frequency of color difference signals U and V in the vertical direction of the image, the flicker detecting section includes at least the brightness frequency detecting section.

5. A signal processing apparatus according to claim 3, wherein, between a brightness frequency detecting section for detecting a spatial frequency of a brightness signal in a vertical direction of an image and a color difference frequency detecting section for detecting a spatial frequency of color difference signals U and V in the vertical direction of the image, the flicker detecting section includes at least the brightness frequency detecting section.

6. A signal processing apparatus according to claim 2, wherein the flicker detecting section includes: a first horizontal direction integration circuit for successively integrating a brightness signal among image signals from the flicker detection pre-processing section, for each line of a display screen in a horizontal direction; a first frequency conversion circuit for performing a discrete Fourier transform process on an integration value that is integrated in the first horizontal direction integration circuit; and a first frequency detection circuit for detecting a spatial frequency at which a power of the brightness signal is at a maximum, based on a result of the discrete Fourier transform process.

7. A signal processing apparatus according to claim 3, wherein the flicker detecting section includes: a first horizontal direction integration circuit for successively integrating a brightness signal among image signals from the flicker detection pre-processing section, for each line of a display screen in a horizontal direction; a first frequency conversion circuit for performing a discrete Fourier transform process on an integration value that is integrated in the first horizontal direction integration circuit; and a first frequency detection circuit for detecting a spatial frequency at which a power of the brightness signal is at a maximum, based on a result of the discrete Fourier transform process.

8. A signal processing apparatus according to claim 3, wherein the flicker detecting section includes:
   a first horizontal direction integration circuit for successively integrating a brightness signal from the flicker detection pre-processing section, for each line of a display screen in the horizontal direction;
   a first frequency conversion circuit for performing a discrete Fourier transform process on an integration value integrated in the first horizontal direction integration circuit;
   a first frequency detection circuit for detecting a spatial frequency at which a power of the brightness signal is at a maximum, based on a result of the discrete Fourier transform process in the first frequency conversion circuit;

a second horizontal direction integration circuit for successively integrating a color difference signal U from the flicker detection pre-processing section, for each line of the display screen in the horizontal direction;

a second frequency conversion circuit for performing a discrete Fourier transform process on an integration value integrated in the second horizontal direction integration circuit;

a second frequency detection circuit for detecting a spatial frequency at which a power of the brightness signal is at a maximum, based on a result of the discrete Fourier transform process in the second frequency conversion circuit;

a third horizontal direction integration circuit for successively integrating a color difference signal V from the flicker detection pre-processing section, for each line of the display screen in the horizontal direction;

a third frequency conversion circuit for performing a discrete Fourier transform process on an integration value integrated in the third horizontal direction integration circuit; and a third frequency detection circuit for detecting a spatial frequency that at which a power of the brightness signal is at a maximum, based on a result of the discrete Fourier transform process in the third frequency conversion circuit.

9. A signal processing apparatus according to claim 8, wherein a flicker frequency is determined by a majority of respective flicker frequencies from the first, second and third frequency detection circuits.

10. A signal processing apparatus according to claim 1, wherein the second shading correcting section for correctsing an image in the horizontal and vertical directions of the image.

11. A signal processing apparatus according to claim 1, wherein the second shading correcting section corrects an image in a vertical direction of the image.

12. A signal processing apparatus according to claim 10, wherein the second shading correcting section performs 90 to 100 percent of shading correction.

13. A signal processing apparatus according to claim 11, wherein the second shading correcting section performs 90 to 100 percent of shading correction.

14. A signal processing apparatus according to claim 1, wherein the first shading correcting section corrects an image in horizontal and vertical directions of the image.

15. A signal processing apparatus according to claim 11, wherein the first shading correcting section corrects the image in a horizontal direction of the image, and data inputted from the second shading correcting section in the vertical direction of the image, is processed via multiplication with data from the first shading correcting section, so that a shading correction process in horizontal and vertical directions of the image is performed in the photographed image processing section.

16. A signal processing apparatus according to claim 1, wherein the common pre-processing section includes a shading correcting section for correcting an image in a vertical direction of the image, the first shading correcting section corrects the image in a horizontal direction of the image wherein data is processed via multiplication with data inputted from the shading correcting section for correcting the image in the vertical direction of the image, and the flicker detection pre-processing section inputs the data from the shading correcting section for correcting the image in the vertical direction of the image.

17. A signal processing apparatus according to claim 1, wherein the flicker detection pre-processing section includes a digital gain correcting section for correcting signal levels of three colors that vary due to a color temperature of a light source.

18. A signal processing apparatus according to claim 1, wherein the flicker detection pre-processing section includes an interpolation section for generating a brightness signal Y and color difference signals U and V from inputted primary RGB color signals.

19. A signal processing apparatus comprising:
a common pre-processing section, for performing signal processing common to a photographed image process and a flicker detection process, on an input image signal;
a photographed image processing section for performing image signal processing on an image signal from the common pre-processing section to generate a displayed image;
a flicker detection pre-processing section for performing image signal processing on the image signal from the common pre-processing section for flicker detection; and
a flicker detecting section for performing flicker detection based on the image signal from the flicker detection pre-processing section,
wherein the flicker detection pre-processing section includes a light and shade correcting section for correcting light and shade of a displayed image.

20. A signal processing apparatus according to claim 19, wherein the flicker detection pre-processing section includes a shading correcting section for correcting a decrease of a peripheral light amount due to lens shading; a digital gain correcting section for correcting signal levels of three colors that vary due to a color temperature of a light source; an interpolation section for generating a brightness signal Y and color difference signals U and V from inputted primary RGB color signals.

21. A signal processing apparatus according to claim 19, wherein the light and shade correcting section emphasizes contrast to perform an emphasizing process for light and shade of a displayed image.

22. A signal processing apparatus according to claim 20, wherein the light and shade correcting section emphasizes contrast to perform an emphasizing process for light and shade of a displayed image.

23. A signal processing apparatus according to claim 1, wherein the second shading correcting section corrects a decrease of a peripheral light amount due to lens shading; a digital gain correcting section for correcting signal levels of three colors that vary due to a color temperature of a light source; and an interpolation section for generating a brightness signal Y and color difference signals U and V from inputted primary RGB color signals.

24. A solid-state image capturing apparatus, comprising:
an image capturing device having therein a plurality of light receiving sections for performing a photoelectric conversion on light from a subject and capturing an image of the subject;
an analog/digital converting section for converting an analog image signal obtained from the image capturing device to a digital image signal; and
a signal processing apparatus according to claim 1, to which a digital image signal from the analog/digital converting section is inputted as the input image signal.

25. An electronic information device having a solid-state image capturing apparatus that includes the signal processing apparatus according to claim 1 as an image input device in an image capturing section.

26. A signal processing method, comprising:
- a common pre-processing step of performing signal processing common to a photographed image process and a flicker detection process on a digital image signal obtained by digital converting an image signal from an image capturing device;
- a photographed image processing step of performing image signal processing on an image signal obtained by the common pre-processing step to generate a displayed image;
- a flicker detection pre-processing step of performing image signal processing on the image signal obtained by the common pre-processing step, for flicker detection; and
- a flicker detecting step of performing flicker detection, on the image signal obtained by the flicker detection pre-processing step,
- wherein the photographed image processing step includes a first shading correction step,
- wherein the flicker detection pre-processing step includes a second shading correction step,
- wherein data from the first and second steps of shading correction is combined.

27. A signal processing method according to claim 26, wherein, between a brightness frequency detecting step for detecting a spatial frequency of a brightness signal in a vertical direction of a displayed image and a color difference frequency detecting step for detecting a spatial frequency of a color difference signal in the vertical direction of the displayed image, the flicker detection step includes at least the brightness frequency detecting step.

28. A signal processing method according to claim 26, wherein the second shading correcting step corrects the image in a vertical direction between horizontal and vertical directions of an image.

29. A signal processing method comprising:
- a common pre-processing step of performing signal processing common to a photographed image process and a flicker detection process on a digital image signal obtained by digital converting an image signal from an image capturing device;
- a photographed image processing step of performing image signal processing on an image signal obtained by the common pre-processing step to generate a displayed image;
- a flicker detection pre-processing step of performing image signal processing on the image signal obtained by the common pre-processing step, for flicker detection; and
- a flicker detecting step of performing flicker detection, on the image signal obtained by the flicker detection pre-processing step,
- wherein the flicker detection pre-processing step includes a light and shade correcting step for correcting light and shade of a displayed image.

30. A signal processing method according to claim 29, wherein the flicker detection pre-processing step includes a shading correcting step of correcting a decrease of a peripheral light amount due to lens shading; a digital gain correcting step of correcting signal levels of three colors that vary due to a color temperature of a light source; an interpolation step of generating a brightness signal Y and color difference signals U and V from inputted primary RGB color signals.

31. A signal processing method according to claim 26, wherein the second shading correcting step corrects a decrease of a peripheral light amount due to lens shading; a digital gain correcting step of correcting signal levels of three colors that vary due to a color temperature of a light source; and an interpolation step of generating a brightness signal Y and color difference signals U and V from inputted primary RGB color signals.

32. A non-transitory readable recording medium that is computer-readable and in which a control program is stored, wherein the control program includes instructions to perform process steps for causing a computer to execute at least the flicker detection pre-processing step and the flicker detecting step among the steps of the signal processing method according to claim 26.

* * * * *